Jan. 9, 1968  H. MOREINES  3,363,111
AMPLITUDE RESPONSIVE SIGNAL SELECTIVE GATE FOR
MONITORING DUAL REDUNDANT SYSTEMS
Filed Oct. 23, 1963  3 Sheets-Sheet 1

INVENTOR.
HAROLD MOREINES
BY
*Herbert L. Davis*
ATTORNEY

INVENTOR.
HAROLD MOREINES
BY
ATTORNEY

United States Patent Office 3,363,111
Patented Jan. 9, 1968

3,363,111
AMPLITUDE RESPONSIVE SIGNAL SELECTIVE GATE FOR MONITORING DUAL REDUNDANT SYSTEMS
Harold Moreines, Springfield, N.J., assignor to The Bendix Corporation, Teterboro, N.J., a corporation of Delaware
Filed Oct. 23, 1963, Ser. No. 318,339
10 Claims. (Cl. 307—235)

ABSTRACT OF THE DISCLOSURE

An amplitude responsive signal selective gate for rejecting specific modes of failed signals in dual redundant systems including means responsive to the amplitude of the signals in said dual redundant systems acting in a sense to avoid catastrophic signal modes. Thus the amplitude signal responsive means in one form of the invention may select the maximum amplitude signal in order to avoid null failures where this signal mode is catastrophic while in another form of the invention the amplitude signal responsive means may select the minimum amplitude signal between the two redundant signal systems for avoiding hardover failures where this mode is catastrophic.

---

This invention relates to signal selection in monitoring dual redundant systems and is more particularly directed to the application of a signal selection device operating as a maximum amplitude or minimum amplitude selective gate.

Modes of equipment failure can be characterized as active or passive. Predominant occurences included in these categories are failure to null which is passive and hardover failures which are active. Depending upon the particular control system application, a specific mode of failure may result in a safe or catastrophic condition. For example, a critical feedback path required for stability could fail hardover, yet permit safe pilot recovery. But loss of this feedback signal due to null failure might cause rapidly divergent oscillation and be catastrophic. Conversely, a command channel hardover failure could result in a maneuver exceeding structural limits thus being catastrophic whereas a null failure of the same command would be safe.

There has been heretofore provided signal selection and monitoring of redundant systems that has been "fail-operative," that is, as long as there is a normal signal presented to the system, it will be communicated to the output, but signals above or below a specified set of limits will not pass. These systems make no provision for characterization of equipment failures as either catastrophic or safe.

An object of the invention is to provide a signal selection and monitoring system which avoids failures which are catastrophic but permits failures which are safe.

An object of the invention is to provide a redundancy system using dual redundancy rather than triple redundancy thus reducing system weight, complexity, and cost.

Another object of the invention is to provide means for selecting the maximum amplitude signal between two redundant signal paths.

Another object of this invention is to provide means for selecting the minimum amplitude signal between two redundant signal paths.

This invention contemplates a dual redundant system providing means for avoiding catastrophic failures but permitting safe failures. In order to avoid null failures where this mode is catastrophic, means are provided for selecting the maximum amplitude signal between two redundant signal paths. Means are also provided to select the minimum amplitude signal between two redundant signal paths for avoiding hardover failures when this mode is catastrophic.

The present invention is concerned with signal selection and monitoring techniques in dual-redundant computing and control systems, commonly referred to as "fail-safe" or "fail-soft," as distinguished from the "fail-operative" triple redundant system disclosed and claimed in copending U.S. application Ser. No. 314,397, filed Oct. 7, 1963, by Harold Moreines, now U.S. Patent No. 3,305,735, granted Feb. 21, 1967 and assigned to The Bendix Corporation, assignee of the present invention.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

Figure 1:
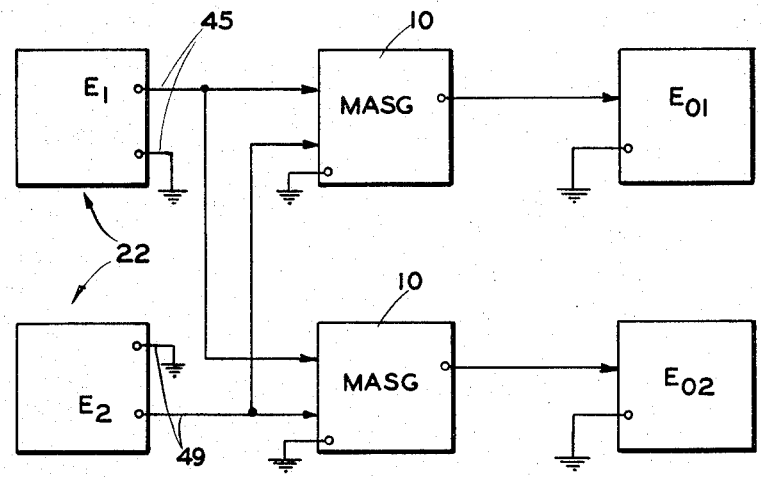
FIGURE 1 is a block diagram of a dual redundancy system embodying maximum amplitude selective gates (MASG) to reject null failures.

Referring to the drawing of FIGURE 1, there is provided a block diagram showing the use of maximum amplitude selective gates 10 to reject null failures where this mode is catastrophic.

Maximum amplitude selective gate

Figure 2:
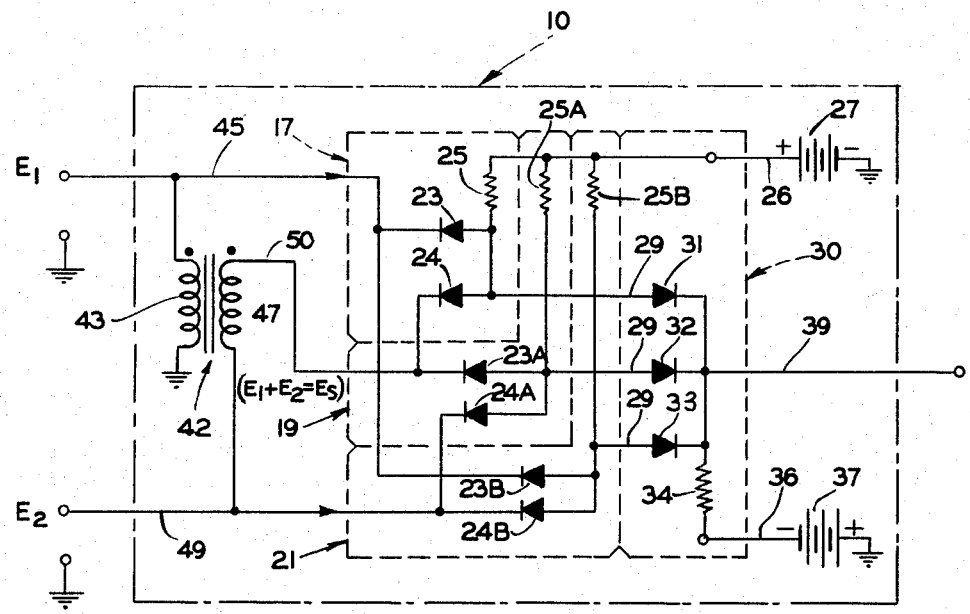
FIGURE 2 is a schematic wiring diagram of one form of maximum amplitude selective gate adapted for use in the dual redundancy system of FIGURE 1.

In FIGURE 2, there is shown a wiring diagram of one form of the maximum amplitude selective gate 10 in which there is provided a combination of "AND" and "OR" gate circuits wherein three AND gates 17, 19, and 21 on three channels compare alternating current output signals supplied by a dual redundant system indicated generally by the numeral 22.

Each of the "AND" gates 17, 19, and 21 are shown as of a diode logic "AND" gate in which "AND" gate 17 includes two input diodes 23 and 24, a current limiting resistor 25 connected to a positive potential 26 of battery 27, while in "AND" gates 19 and 21, corresponding parts have been indicated by like numerals with the suffix A and B, respectively. Each of the "AND" gates have an output line 29.

The amplitude selective property of each of the "AND" gate circuits 17, 19, and 21 is such that, if two signals are applied to the inputs of the diodes thereof, the respective output at 29 is equal to the most negative of the inputs.

These output lines 29, as shown in FIGURE 2, are in turn connected to a diode logic "OR" gate 30 including three input diodes 31, 32, and 33 and a current limiting resistor 34 connected to a negative potential 36 of a battery 37. The "OR" gate 30 has an output line 39.

The amplitude selective property of this "OR" gate circuit 30 is such that, if three signals are applied respectively to the input diodes 31, 32, and 33, the output at the line 39 would be equal to the most positive of the input signals. In these "AND" and "OR" gates, the aforementioned properties hold true on an instantaneous basis, and hence may be applied to any time sharing data such as suppressed-carrier modulated voltages, modulated D.C. voltages, amplitude modulated or width modulated pulses or binary modulated-carrier, as well as conventional digital data.

In the maximum-amplitude selective gate 10, as shown in FIGURE 2, there is further provided a summing transformer 42 having a primary winding 43 connected across the output lines 45 of one of the dual redundant equipment supplying the signal $E_1$ while the secondary winding 47 of the transformer 42 is inductively coupled to the winding 43 and has one end connected to a line 49 leading from the other of the redundant equipment supplying the signal $E_2$. The opposite end of the secondary winding 47 is connected by a conductor 50 to the input diode 24 of the "AND" gate 17 and the input diode 23A of the "AND" gate 19. The conductor 45 carrying the signal $E_1$ is connected to the input diode 23 of the "AND" gate 17, and the input diode 23B of the "AND" gate 21. The conductor 49 carrying the signal $E_2$ is connected to the input diode 24A of the "AND" gate 19 and input diodes 24B of the "AND" gate 21.

The aforenoted arrangement is such that the alternating current signal applied by the transformer 42 to the conductor 50 is the sum of the alternating current signals $E_1$ and $E_2$ equivalent to a signal $E_s$ while the signal applied to the input diodes 23 and 23B is equivalent to the signal $E_1$, and the signal applied to the input diodes 24A and 24B will be equivalent to the signal $E_2$.

The signals thus applied through the lines 45 and 49 to the "AND" gates 17, 19, and 21 may be suitable alternating current signals and the arrangement is that the more negative of each of the aforenoted pairs of input signals is emitted at the output lines 29 of each "AND" gate. These output signals are applied to the "OR" gate 30 which selectively emits to the output line 39 a signal equal to the more positive signal applied.

Thus the redundant signals $E_1$ and $E_2$ and the sum of $E_1$ and $E_2$ equal to $E_s$ are supplied to the "AND" gates of the maximum amplitude selector gate 10 of FIGURE 2 so that redundant signals $E_1$ and $E_2$ are applied to the input diodes of the "AND" gate 21; the sum of the signals $E_1+E_2$ equal to $E_s$ and the signal $E_2$ is applied to the input diodes 23A and 24A of the "AND" gate 19; and the signal $E_1$ and the sum of signals $E_1+E_2$ equal to $E_s$ is applied to the input diodes 23 and 24 of the "AND" gate 17. These "AND" gates, as described in the copending U.S. application Ser. No. 314,397, filed Oct. 7, 1963, by Harold Moreines, and now U.S. Patent No. 3,305,735, then transmit the more negative of the input signals to the output lines 29 leading to the "OR" gate circuit 30 which in turn transmits the more positive signal of the "AND" gate output signals to the output line 39.

Thus, in a normal situation, since reference signal $E_s$ has the greatest amplitude, one of the signals $E_1$ or $E_2$ is intermediate, and is transmitted to the line 39.

When either signal $E_1$ or signal $E_2$ fails by going to null, the sum signal is equal to the normal signal, thus the fail signal cannot be intermediate, and the catastrophic fail signal is rejected, because in the absence of an intermediate signal the signal of maximum amplitude is applied at the output line by the maximum amplitude selective gate 10. If a hardover occurs in the equipment when this circuit is appropriately aligned, the hardover signal would be transmitted since it is considered a safe failure. The initial transient alerts the pilot to take action upon the failure.

*Second form of maximum amplitude selective gate*

Figure 3:
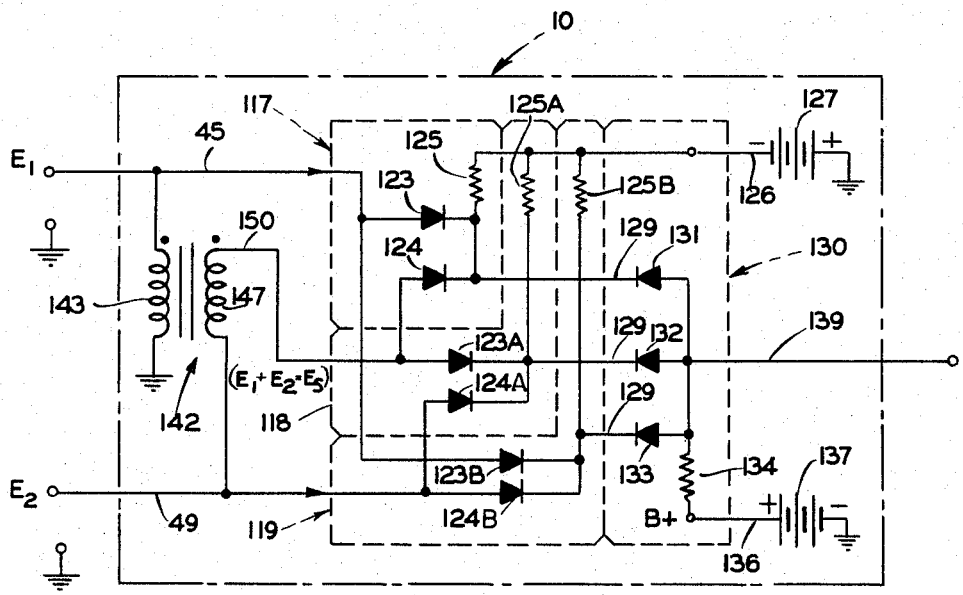
FIGURE 3 is a schematic wiring diagram of an alternate form of maximum amplitude selective gate adapted for use in the dual redundancy system of FIGURE 1.

An alternative form of a maximum amplitude selective gate is illustrated in FIGURE 3 showing a combination of "OR" and "AND" gate circuits wherein three "OR" gates 117, 118, and 119 form three channels to prepare the signals of the dual redundant system in much the same manner as heretofore described with reference to the circuit of FIGURE 2.

Thus the "OR" gates 117, 118, and 119 select the most positive of the signals applied to each and the outputs thereof are connected to the inputs of an "AND" gate 130 which selectively emits the most negative signal applied resulting in the application of a maximum amplitude selected signal to the line 139.

Each of the "OR" gates 117, 118, and 119 are shown as of a conventional diode logic "OR" gate in which "OR" gate 117 includes two input diodes 123 and 124, a current limiting resistor 125 connected to a negative potential 126 of a battery 127, while in the "OR" gates 118 and 119, corresponding parts have been indicated by like numerals with the suffixes A and B, respectively. Each of the "OR" gates have an output line 129.

The amplitude selective property of each of the "OR" gate circuits 117, 118, and 119 is such that, if two signals are applied to the inputs of the diodes thereof, the respective output at 129 is equal to the most positive of the two inputs.

These output lines 129, as shown in FIGURE 3, are in turn connected to a diode logic "AND" gate circuit 130 including three input diodes 131, 132, and 133 and a current limiting resistor 134 connected to a positive potential 136 of a battery 137, and said "AND" gate 130 further has an output line 139.

The amplitude selective property of this "AND" gate circuit 130 is such that, if three signals are applied respectively to the input diodes 131, 132, and 133, the output at the line 139 would be equal to the most negative of the input signals. In these "OR" and "AND" gates, the aforenoted properties hold true on an instantaneous basis.

In the form of the maximum selected gate 10, shown in FIGURE 3, there is further provided a summing transformer 142 having a primary winding 143 connected across the output lines 45 of one of the dual redundant equipment supplying the alternating current signal $E_1$ while the secondary winding 147 is inductively coupled to the windings 143 and has one end connected to the line 49 leading from the other of the redundant equipment supplying an alternating current signal $E_2$.

The opposite end of the secondary winding 147 is connected by a conductor 150 to the input diode 124 of the "OR" gate 117 and the input diode 123A of the "OR" gate 118. The output line 45 carrying the alternating current signal $E_1$ is connected to the input diode 123 of the "OR" gate 117 and the input diode 123B of the "OR" gate 119. The conductor 49 carrying the alternating current signal $E_2$ is connected to the input diode 124A of the "OR" gate 118 and input diode 124B of the "AND" gate 119.

The aforenoted arrangement is such that the alternating current signal applied by the summing transformer 142 through the conductor 150 to the diodes 124 and 123A is the sum of the signals $E_1$ plus $E_2$ equivalent to a reference signal $E_s$ while the signal applied to the diodes 123 and 123B is equivalent to the alternating current signal $E_1$ and the signal applied to the input diodes 124A and 124B will be equivalent to the alternating current signal $E_2$.

The signals thus applied through the lines 45 and 49 to the "OR" gates 117, 118, and 119 is such that the more positive of each of the aforenoted pairs of alternating current input signals is emitted at the output lines 129 of each "OR" gate. These signals are applied to the "AND" gate 130 which selectively emits to the line 139 a signal equal to the more negative signal applied or the minimum-amplitude selected signal.

The arrangement is such that, as in the case of the circuit, shown in FIGURE 2, since the signal $E_s$ has the greatest amplitude, one of the signals $E_1$ and $E_2$ is intermediate and is transmitted to the line 139 so that, when either signal $E_1$ or signal $E_2$ fails to a null value, the sum signal is equal to the normal signal. Thus, a fail signal cannot be intermediate and the catastrophic fail signal is rejected in much the same manner as in the circuit heretofore described with reference to FIGURE 2.

*Minimum amplitude selective gates*

Figure 4:
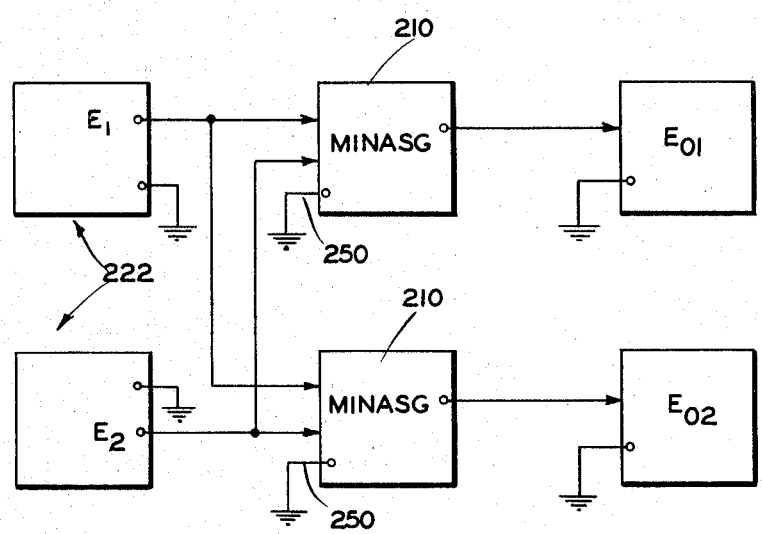
FIGURE 4 is a block diagram of a dual redundancy system embodying minimum amplitude selective gates (MINASG) to reject hardover failures.

Referring to the drawing of FIGURE 4, there is shown a minimum amplitude selective gate 210 for selecting the minimum amplitude signal between dual redundant alternating current signal paths leading from redundant equipment 222 in order to avoid hardover failure when this mode is catastrophic.

Figure 5:
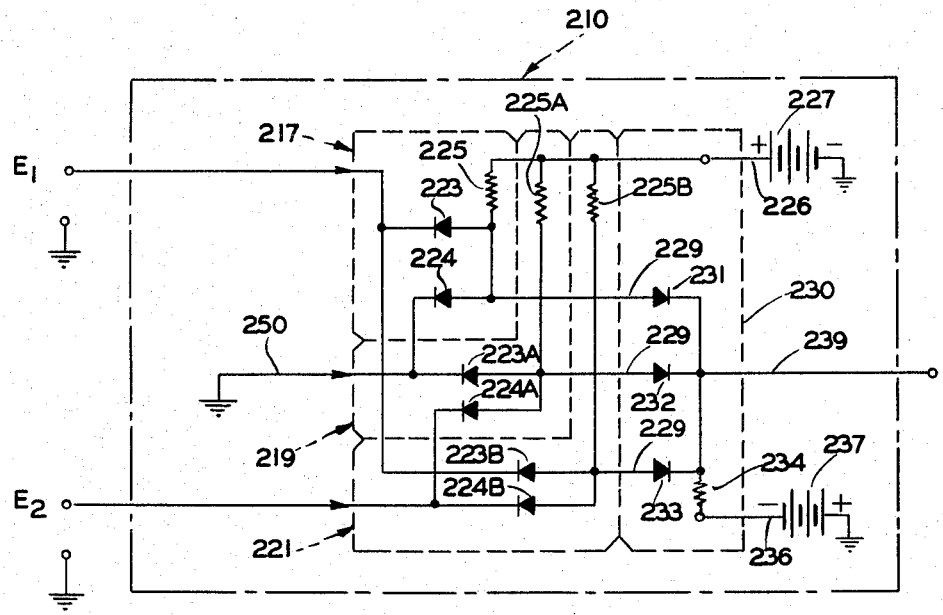
FIGURE 5 is a schematic wiring diagram of one form of minimum amplitude selective gate adapted for use in the dual redundancy system of FIGURE 4.

In FIGURE 5, there is shown a wiring diagram of one form of the minimum amplitude selective gate 210 in which there is provided a combination of "AND" and "OR" gate circuits wherein three "AND" gates 217, 219, and 221 of three channels bear alternating current signals from a dual redundant system indicated generally by the numeral 222. Each of the "AND" gates 217, 219, and 221 are shown as of a logic diode "AND" gate in which "AND" gate 217 includes two input diodes 223, and 224, a current limiting resistor 225 connected to a positive potential 226 of a battery 227, while in the "AND" gates 219 and 221 corresponding parts have been indicated by like numerals bearing the suffixes A and B, respectively. Each of the "AND" gates have an output line 229.

The amplitude selective property of each of the "AND" gates 217, 219, and 221 is such that, if two signals are applied to the inputs to the diodes thereof, the respective output at the lines 229 is equal to the most negative of the inputs.

These output lines 229, as shown in FIGURE 5, are in turn connected to a conventional diode "OR" gate 230 including three input diodes 231, 232, and 233 and a current limiting resistor 234 connected to a negative potential 236 of a battery 237. The "OR" gate 230 has an output line 239.

The amplitude selective property of this "OR" gate 230 is such that if three signals are applied respective to the input of the diodes 231, 232, and 233, the output at the line 239 would be equal to the most positive of the input signals. In these "AND" and "OR" gates, the aforenoted properties hold true on an instantaneous basis.

In the minimum amplitude selective gate 210, as shown in FIGURE 5, the redundant signals $E_1$ and $E_2$ are applied to the "AND" gates of the minimum amplitude selected gate 210 along with a third input 250 which is grounded so as to supply a signal $E_0$ as a zero reference signal.

Thus, as shown in the drawing of FIGURE 5, the alternating current signals $E_1$ and $E_2$ are applied to the diodes 223B and 224B of the "AND" gate 221; the alternating current signal $E_1$ is applied to one input diode 223 of the "AND" gate 217 while the other input diode 224 of the "AND" gate 217 is connected to the ground signal $E_0$ by a conductor 250. The alternating current signal $E_2$ is applied to one input diode 224A of the "AND" gate 219 while the other input diode 223A of the "AND" gate 219 is connected through the conductor 250 to the ground signal $E_0$.

Thus, the redundant signals $E_1$ and $E_2$ and the zero reference signal $E_0$, are applied to the "AND" gates of the minimum amplitude selective gate 210 of FIGURE 5 so that the redundant signals $E_1$ and $E_2$ are applied to the input diodes of the "AND" gate 221; the zero reference signal $E_0$, and the signal $E_2$ is applied to the input diodes of the "AND" gate 219 and the signal $E_1$, and the zero reference signal $E_0$ are applied to the input diodes of the "AND" gate 217. These "AND" gates, as disclosed in the copending U.S. application Ser. No. 314,397, filed Oct. 7, 1963, by Harold Moreines, now U.S. Patent No. 3,305,735, then transmit the more negative of the signals applied to the "AND" gates through the output lines 229 leading to the "OR" gate circuit 230 which in turn transmits the more positive signal of the signals of the "AND" gate output signals to the output line 239.

Thus, in a normal situation, since zero reference signal $E_0$ has the lesser amplitude, one of the signals $E_1$ or $E_2$ is intermediate and is transmitted to the line 239.

*Second form of minimum amplitude selective gate*

Figure 6:
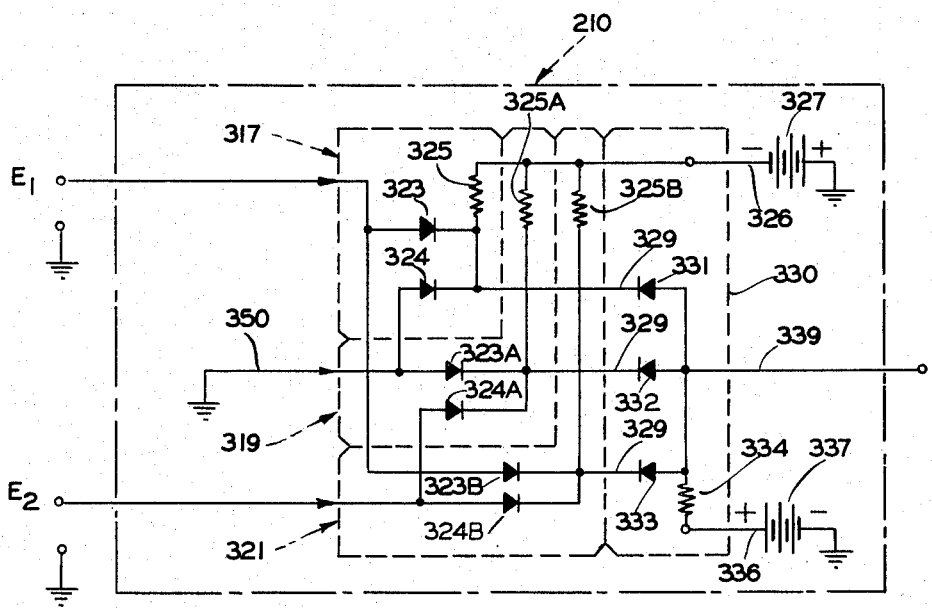
FIGURE 6 is a schematic wiring diagram of an alternate form of minimum amplitude selective gate adapted for use in the dual redundancy system of FIGURE 4.

An alternative form of a minimum amplitude selective gate is illustrated in FIGURE 6 showing a combination of "OR" and "AND" gate circuits wherein three "OR" gates 317, 319, and 321 form three channels to prepare the signals of a dual redundant system in much the same manner as heretofore discussed with reference to the circuit of FIGURE 5.

Thus, the "OR" gates 317, 319, and 321 select the most positive of the signals applied to each, and the outputs thereof are connected to the inputs of an "AND" gate 330 which selectively emits the most negative signal applied resulting in the application of a minimum amplitude selective signal to the output line 339. Each of the "OR" gates 317, 319, and 321 is shown as a conventional diode logic "OR" gate in which "OR" gate 317 includes two input diodes 323, 324, a current limiting resistor 325 connected to a negative potential 326 of a battery 327 while in the "OR" gates 319 and 321, corresponding parts have been indicated by like numerals with the suffixes A and B, respectively. Each of the "OR" gates have an output line 329.

The amplitude selective property of each of the "OR" gates 317, 319, and 321 is such that, if two signals are applied to the respective inputs thereof, the output at 329 would be equal to the most positive of the two inputs. These output lines 329, as shown in FIGURE 6, are in turn connected to a conventional diode logic "AND" gate 330 including three input diodes 331, 332, and 333 and a current limiting resistor 334 connected to a positive potential 336 of a battery 337, and said "AND" gate 330 further has an output line 339.

The amplitude selective property of this "AND" gate 330 is such that, if three signals are applied respectively to the input diodes 331, 332, and 333, the output at the line 339 would be equal to the most negative of the input signals. In these "OR" and "AND" gates, the aforenoted properties hold true on an instantaneous basis.

In the minimum amplitude selective gate 210, as shown in FIGURE 4, the redundant alternating current signals $E_1$ and $E_2$ are applied to the "OR" gates of the minimum amplitude selective gate of FIGURE 6 along with a third zero reference signal $E_0$ at input 350.

Thus, as shown in the drawing of FIGURE 6, the alternating current signals $E_1$ and $E_2$ are applied to the diodes 323B and 324B of the "AND" gate 321; the alternating current signal $E_1$ is applied to one input diode 323 of the "AND" gate 317 while the other input diode 324 is connected to the zero reference signal $E_0$ by the conductor 350. The alternating current signal $E_2$ is applied to one input diode 324A of the "OR" gate 319 while the other input diode 323A of the "OR" gate 319 is connected through the conductor 350 to the ground or zero reference signal $E_0$.

Thus, the redundant signals $E_1$ and the zero reference signal $E_0$ are applied to the input diodes of the "OR" gates 317 and 319 of the minimum amplitude selective gate of FIGURE 6; the redundant signals $E_1$ and $E_2$ are applied to the input diodes of the "OR" gate 321; the zero reference signal $E_0$ and the signal $E_2$ are applied to the input diodes of the "OR" gate 319 and the zero reference signal $E_0$ and the signal $E_1$ are applied to the input diodes of the "OR" gates 317.

These "OR" gates, as disclosed in the U.S. Patent No. 3,305,735, transmit the more positive of the signals applied to the "OR" gates through the output lines 329 leading to the "AND" gate circuit 330 which in turn transmits the more negative signal of the "OR" gate output signals to the output line 339. Thus, in a normal situation, since signal $E_0$ has a lesser amplitude, one of the signals $E_1$ or $E_2$ is intermediate and is transmitted to the line 339 as the minimum amplitude selective signal.

Under normal operating conditions then, the selected alternating current signal applied to the output line 239 of FIGURE 5 and the output line 339 of FIGURE 6 will be either $E_1$ or $E_2$ whichever has the lesser amplitude. Should a null failure occur, the selected output signal applied to the output line will be zero, since in the absence of an intermediate signal, the signal of minimum amplitude is applied at the output line by the minimum amplitude selective gate 210. However, in the event of a hardover signal, the hardover fail signal is rejected since this amplitude is maximum. The normal signal is transmitted if it is of the same polarity as a hardover signal, but if it is of opposite polarity, the total effected output signal applied at the output line will be zero for both redundant channels, since the zero signal would in effect then be an intermediate signal.

Thus, in this invention, catastrophic failures are rejected and safe failures have allowed time for pilot protection and appropriate action before the catastrophic situation can develop and are transmitted providing a completely passive, simple, and reliable signal selecting dual redundant circuit reducing system weight, complexity, and cost.

While several embodiments of the invention have been illustrated and described, various changes in the form and relative arrangements of the parts, which will now appear to those skilled in the art may be made without departing from the scope of the invention. Reference, therefore, is to be had to the appended claims for a definition of the limits of the invention.

What is claimed is:

1. In a dual redundant system a selective gate for rejecting specific modes of failed signals,
    said selective gate comprising three primary gate means,
    each of said primary gate means including a pair of diodes and a current limiting resistor connected to a source of voltage in one sense,
    first means for supplying a pair of electrical output signals from said dual redundant system,
    second means for supplying an electrical reference signal equal to the algebraic sum of said pair of electrical output signals,
    said first and second means thereby providing three primary electrical output signals,
    the pair of diodes of each of said primary gate means having inputs connected respectively to a different pair of each of said three primary electrical output signals and being so arranged that said three primary gate means provide as three secondary output signals, respectively, the greater in one sense of each of said different pairs of three primary electrical signals,
    secondary gate means including three diodes and a current limiting resistor connected to a source of voltage in an opposite sense from the diodes and current limiting resistor of the primary gate means and so arranged that the diodes of the secondary gate means act on said three secondary output signals in an opposite sense from the diodes of said primary gate means so as to provide as a main output signal from the diodes of the secondary gate means the greatest in an opposite sense of said three secondary output signals applied to the diodes of said secondary gate means and thereby an output signal intermediate one of said pair of electrical output signals and the reference signal equivalent to the algebraic sum of the pair of electrical output signals from said dual redundant system.

2. In a dual redundant system providing a pair of alternating current input signals, a selective gate for rejecting specific modes of failed signals,
    said selective gate comprising three "AND" gate means,
    each of said "AND" gate means including two diodes and a current limiting resistor connected to a positive potential for selecting and providing as an output signal the more negative of two input signals applied to the diodes in combination with "OR" gate means including a current limiting resistor connected to a negative potential and a plurality of input diodes to which said output signals are connected for selecting the most positive of said output signals,
    dual redundant means for applying the pair of alternating current input signals to said three "AND" gate means,
    and means for supplying a zero reference potential to a pair of said "AND" gate means.

3. In a dual redundant system providing a pair of alternating current input signals, a selective gate for rejecting specific modes of failed signals,
    said selective gate comprising three "OR" gate means,
    each of said "OR" gate means including two diodes and a current limiting resistor connected to a negative potential for selecting and providing as an output signal the more positive of two input signals applied to the diodes in combination with "AND" gate means including a current limiting resistor connected to a positive potential and a plurality of input diodes to which said output signals are connected for selecting the most negative of said output signals,
    dual redundant means for applying the pair of alternating current input signals to said three "OR" gate means,
    and means for supplying a zero reference potential to a pair of said "OR" gate means.

4. In a dual redundant system providing a pair of input signals, a selective gate for rejecting specific modes of failed signals,
    said selective gate comprising three primary gate means,
    each of said primary gate means including two diodes and a current limiting resistor connected to a source of voltage in one sense for selecting and providing as an output signal the greater in one sense of said pair of input signals applied to the diodes in combination with a secondary gate means including a plurality of input diodes to which said output signals are connected and a current limiting resistor connected to a source of voltage in an opposite sense from the diodes and the current limiting resistor of the primary gate means and so arranged that the diodes of the secondary gate means act on said output signals in an opposite sense from the diodes of said primary gate means so as to provide as a main output signal from the diodes of said secondary gate means the greatest in an opposite sense of said output signals,
    dual redundant means for applying said pair of input signals to said three primary gate means,
    and means for supplying a reference signal to a pair of said primary gate means.

5. In a dual redundant system a selective gate for rejecting specific modes of failed signals,
    said selective gate comprising three "AND" gate means,
    each of said "AND" gate means including two diodes and a current limiting resistor connected to a positive potential for selecting and providing as an output signal the more negative of two input signals applied to the diodes in combination with "OR" gate means including a current limiting resistor connected to a negative potential and a plurality of input diodes to which said output signals are connected for selecting the most positive of said output signals, dual redundant means for applying dual signals to said three "AND" gate means, and summation means for applying the sum of said dual signals to a pair of said "AND" gate means.

6. In a dual redundant system a selective gate for rejecting specific modes of failed signals, said selective gate comprising three "OR" gate means, each of said "OR" gate means including two diodes and a current limiting resistor connected to a negative potential for selecting and providing as an output signal the more positive of two input signals applied to the diodes in combination with "AND" gate means including a current limiting resistor connected to a positive potential and a plurality of input diodes to which said output signals are connected for selecting the most negative of said output signals, dual redundant means for applying dual signals to said three "OR" gate means, and summation means for applying the sum of said dual signals to a pair of said "OR" gate means.

7. In a dual redundant system a selective gate for rejecting specific modes of failed signals, said selective gate comprising three primary gate means, each of said primary gate means including two diodes having different pairs of input signals applied thereto and a current limiting resistor connected to a source of voltage in one sense for selecting and providing as an output signal the greater in one sense of each of said different pairs of input signals applied to the diodes in combination with a secondary gate means including a plurality of input diodes to which said output signals are connected and a current limiting resistor connected to a source of voltage in an opposite sense from the diodes and the current limiting resistor of the primary gate means and so arranged as to select the greatest in an opposite sense of said output signals, dual redundant means for applying dual signals to said three primary gate means, and summation means responsive to said dual signals for applying the sum of said dual signals to a pair of said primary gate means.

8. In a dual redundant system, means for supplying dual output signals from said dual redundant system, other means responsive to said dual signals for supplying a third signal equivalent to an algebraic sum of said dual signals, a device for selecting a median amplitude signal from said three signals, said device comprising inputs for receiving said signals, gating means connected to said inputs for selecting and providing as secondary output signals the greater in one sense of the signals applied thereto, in combination with other gating means for selecting from said secondary output signals and providing as a main output signal the greatest in an opposite sense of said secondary output signals so as to select the median amplitude signal from among said first-mentioned three signals, 9. In a dual redundant system, means for selecting a signal of maximum amplitude from dual output signals provided by said dual redundant system, said selecting means comprising means for supplying said dual output signals, other means responsive to said dual signals for supplying a third signal equivalent to a sum of said dual signals, a device for selecting a median amplitude signal from said three signals, said device comprising inputs for receiving said signals, gating means connected to said inputs for selecting and providing as secondary output signals the greater in one sense of the signals applied thereto, in combination with other gating means for selecting from said secondary output signals and providing as a main output signal the greatest in an opposite sense of said secondary output signals so as to select the median amplitude signal from among said first-mentioned three signals, and thereby the signal of maximum amplitude.

10. In a dual redundant system, means for selecting a signal having an amplitude of a sense to avoid specific modes of failed signals in dual output signals provided by said dual redundant system, said selecting means comprising means for supplying said dual output signals, other means for supplying a third reference signal, a device for selecting a median amplitude signal from said three signals, said device comprising inputs for receiving said signals, gating means connected to said inputs for selecting and providing as secondary output signals the greater in one sense of the signals applied thereto, in combination with other gating means for selecting from said secondary output signals and providing as a main output signal the greatest in an opposite sense of said secondary output signals so as to select the median amplitude signal from among said first-mentioned three signals and thereby the signal having the amplitude of said sense to avoid said specific modes of failed signals.

References Cited

UNITED STATES PATENTS

| | | | |
|---|---|---|---|
| 2,670,445 | 2/1954 | Felker | 307—88.5 |
| 3,069,562 | 12/1962 | Steele | 307—88.5 |
| 3,090,943 | 5/1963 | Lewis | 328—92 X |
| 3,305,735 | 2/1967 | Moreines | 307—88.5 |

OTHER REFERENCES

Washburn, S. H.: "An Application of Boolean Algebra to the Design of Electronic Switching Circuits," AIEE Transactions on Communications and Electonics, September 1953, pp. 380–388, vol. 72, No. 1.

Weiss, G., and Lindner, N. J.: "Where You Should Use Series or Parallel Summation," Control Engineering, June 1965, pp. 77–83.

ARTHUR GAUSS, *Primary Examiner.*

R. H. PLOTKIN, *Assistant Examiner.*